US 8,042,868 B2

(12) United States Patent
Sakai et al.

(10) Patent No.: US 8,042,868 B2
(45) Date of Patent: Oct. 25, 2011

(54) POWER SEAT SYSTEM FOR VEHICLE

(75) Inventors: Morio Sakai, Toyota (JP); Masaki Mori, Kariya (JP); Toshiro Maeda, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 155 days.

(21) Appl. No.: 12/558,966

(22) Filed: Sep. 14, 2009

(65) Prior Publication Data

US 2010/0066137 A1    Mar. 18, 2010

(30) Foreign Application Priority Data

Sep. 16, 2008   (JP) .................................. 2008-236540

(51) Int. Cl.
*B60N 2/02*  (2006.01)
*B60N 2/04*  (2006.01)
*B60N 2/06*  (2006.01)
*B60N 2/12*  (2006.01)
*B60N 2/16*  (2006.01)
*B60N 2/18*  (2006.01)
*B60N 2/20*  (2006.01)
*B60N 2/22*  (2006.01)

(52) U.S. Cl. ........... 297/217.3; 297/344.13; 297/344.17; 297/362.11; 200/5 R; 200/600

(58) Field of Classification Search .................. 200/5 R, 200/600, 310, 313, 314; 297/217.3, 330, 297/344.13, 344.17, 362.11
See application file for complete search history.

(56) References Cited

U.S. PATENT DOCUMENTS

| | | | | |
|---|---|---|---|---|
| 3,876,977 | A * | 4/1975 | Ladewig | 200/600 X |
| 5,245,142 | A * | 9/1993 | Sacco et al. | 200/5 R |
| 7,253,367 | B2 * | 8/2007 | Park et al. | 200/5 R X |
| 7,390,982 | B2 * | 6/2008 | Schmidt et al. | 200/5 R |
| 7,432,459 | B2 * | 10/2008 | Stoschek et al. | 200/5 R |
| 7,851,719 | B2 * | 12/2010 | Dzioba | 200/600 |
| 2006/0036335 | A1 * | 2/2006 | Banter et al. | 200/5 R X |
| 2006/0061315 | A1 * | 3/2006 | Schmidt et al. | 318/568.1 |
| 2006/0185968 | A1 * | 8/2006 | Dzioba | 200/5 R |
| 2009/0021041 | A1 * | 1/2009 | Ritzel | 200/5 R X |

FOREIGN PATENT DOCUMENTS

JP    5-77679 A    3/1993
JP    9-142186 A   6/1997

* cited by examiner

*Primary Examiner* — Rodney B White
(74) *Attorney, Agent, or Firm* — Buchanan Ingersoll & Rooney PC

(57) ABSTRACT

A power seat system for a vehicle, includes an operational switch configured to be operated by an occupant for changing positions and attitudes of a vehicle seat whose positions and attitudes are electrically adjusted, a sensor portion positioned in the vicinity of the operational switch and detecting a hand of the occupant approaching the operational switch without contacting the hand of the occupant, and a control portion changing the positions and attitudes of the vehicle seat by actuating an actuator on the basis of an output from the operational switch, the control portion configured to display an operational display indicating adjusting portions and directions of the vehicle seat, which is adjustable by means of the operational switch on the basis of the output from the sensor portion, at an display device provided in a vehicle.

20 Claims, 5 Drawing Sheets

N: Current position
N+1: Current position when a*T elapsed

POWER SEAT SYSTEM FOR VEHICLE

CROSS REFERENCE TO RELATED APPLICATIONS

This application is based on and claims priority under 35 U.S.C. §119 to Japanese Patent Application 2008-236540, filed on Sep. 16, 2008, the entire content of which is incorporated herein by reference.

TECHNICAL FIELD

This disclosure relates to a power seat system for a vehicle. More particularly, this disclosure pertains to a power seat system for a vehicle which electrically controls a positioning and an attitude of a vehicle seat.

BACKGROUND

In recent computerization of vehicles, various types of controls are applied to a power seat for a vehicle in which an attitude and a position of a seat are electrically changed. For example, reclining angles of a seatback, lifted or lowered positions of a seat, positions of the seat in a fore and aft direction, and angles of a seat surface are electrically adjustable in known power seats. JPH05-77679A and JPH09-142186A disclose switches for vehicles to operate such known power seats.

Generally, a switch for operating a power seat is provided at a lower position than a seat surface. Thus, according to a structure of the generally known power seat, an occupant has to grope the switch to operate it without visually confirming the position of the switch. In order to countermeasure the aforementioned problem, according to the known power seat disclosed in JPH05-77679A and JPH09-142186A, an image of a switch portion is displayed on a screen when an occupant contacts the switch for operating the power seat. Further, by displaying each of the switches that is in operation (the switch which the occupant came in contact with) with emphasis on the screen, the known power seat disclosed in JPH05-77679A and JPH09-142186A enables the occupant to visually confirm the position of the switches and to securely operate the switches without operating the switch by groping.

The known power seat disclosed in JPH05-77679A and JPH09-142186A excel in enabling the occupant to visually confirm the position of the switches for operating the power seat. However, according to the construction of the power seat disclosed in JPH05-77679A and JPH09-142186A, the occupant still has to grope a switch until he/she comes in contact with a desired switch. Thus, there are possibilities that the occupant has to move his/her fingers to another switch in a case where he/she found out he/she touched a wrong switch when the touched switch is displayed on the screen. Further, because the switch is actually operated by a feeling of the occupant even after the touched switch is shown on the screen, it becomes difficult to properly adjust the position of the seat in accordance with an intention of the occupant when the number of adjusting directions of the power seat is increased even if the touched switch is visually confirmed on the screen. A seat position is relatively readily adjustable with a known practically implemented power seat in which the power seat is adjustable in a relatively small number of directions (e.g., 4-6). However, in recent years, a power seat having adjustable positions in a large number of directions (e.g., 10-20, or over 20) is about to be practically implemented. Accordingly, a power seat for a vehicle which further excels in visibility and operability is desired.

A need thus exists for a power seat system for a vehicle which is not susceptible to the drawback mentioned above.

SUMMARY OF THE INVENTION

In light of the foregoing, the present invention provides a power seat system for a vehicle, which includes an operational switch configured to be operated by an occupant for changing positions and attitudes of a vehicle seat whose positions and attitudes are electrically adjusted, a sensor portion positioned in the vicinity of the operational switch and detecting a hand of the occupant approaching the operational switch without contacting the hand of the occupant, and a control portion changing the positions and attitudes of the vehicle seat by actuating an actuator on the basis of an output from the operational switch, the control portion configured to display an operational display indicating adjusting portions and directions of the vehicle seat, which is adjustable by means of the operational switch on the basis of the output from the sensor portion, at an display device provided in a vehicle.

BRIEF DESCRIPTION OF THE DRAWINGS

The foregoing and additional features and characteristics of the disclosure will become more apparent from the following detailed description considered with the reference to the accompanying drawings, wherein.

DETAILED DESCRIPTION

Figure 1:
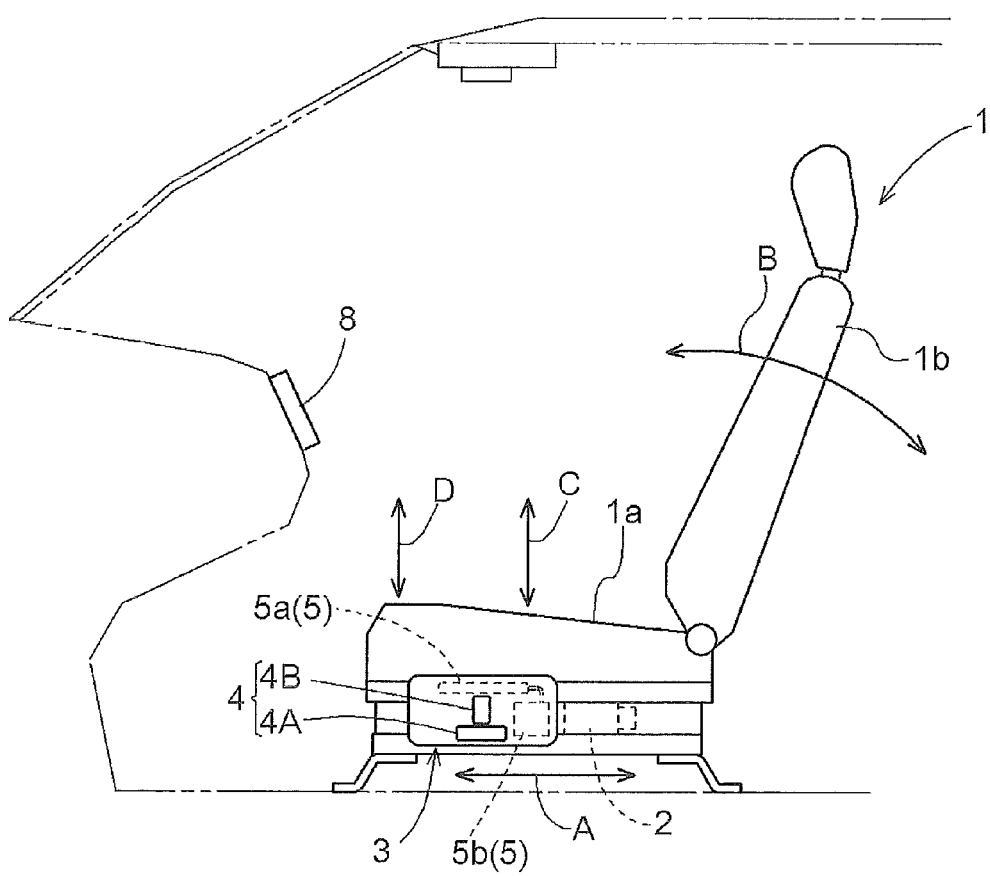
FIG. 1 is a schematic explanatory view of a vehicle seat whose position and attitude are adjusted by means of a power seat system for a vehicle according to an embodiment.

One embodiment of the present invention will be explained with reference to illustrations of drawing figures as follows. Hereinafter, directions, such as "front/rear", "up/down", "lateral", "forward/backward", "upward/downward" or the like, correspond to an orientation of the vehicle. As shown in FIG. 1, a seat 1 according to the embodiment corresponds to an eight-way-seat in which the seat 1 moves or changes attitudes in a total of eight directions. The eight directions in this case include two (front and rear) directions (i.e., directions A in FIG. 1) in which the seat 1 slides along a rail provided on a vehicle, two directions (i.e., directions B in FIG. 1) in which a seatback 1b rotatably supported relative to a seat cushion 1a is reclined in a forward direction and a backward direction, two directions (i.e., directions C in FIG. 1; upward and downward) in which the seat 1 is moved by moving a rear portion of the seat cushion 1a, on which an occupant is seated, in upward and downward directions, and two directions (i.e., directions D in FIG. 1) in which a level of inclinations of a seat surface of the seat cushion is changed by moving a front portion of the seat cushion 1a, on which the occupant is seated, in upward and downward directions.

Figures 2A, 2B:
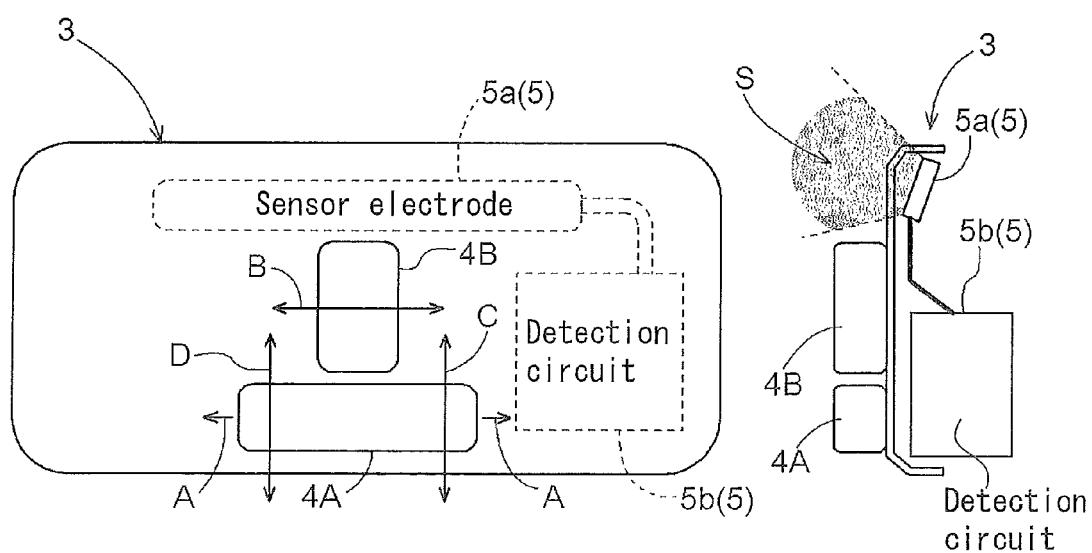
FIG. 2 is a schematic explanatory view showing a construction of a switch assembly which includes an operational switch.

As shown in FIG. 1, an operational switch 4 is provided at a lateral side of the seat cushion 1a so that the occupant enables to direct the movement or the changes in attitudes of the seat 1 in the aforementioned eight directions. As shown in FIGS. 1 and 2, the operational switch 4 includes first and second switches 4A and 4B. The first switch 4A is configured to allow the occupant to provide directions to move the seat 1 or change the attitudes of the seat 1 in the directions A, C, and D. On the other hand, the second switch 4B is configured to allow the occupant to provide directions to change the attitudes of the seat 1 in the directions B.

The first switch 4A is configured and arranged to have a longitudinal side in the front-rear direction resembling the seat cushion 1a. The first switch 4A is configured to output commands to move the seat cushion 1a in directions A by being operated in the longitudinal direction thereof, that is, in the front-rear directions of the seat cushion 1a. Further, the first switch 4A is configured to output commands to move the seat cushion 1 in directions C by operating a rear end portion thereof in the upward and downward directions. Still further, the first switch 4A is configured to output commands to move the front portion of the seat cushion 1a in directions D in the upward and downward directions by operating a front-end portion thereof in the upward and downward directions. The second switch 4B is configured and arranged to have longitudinal sides in an upward and downward direction resembling to the seatback 1b. The second switch 4B is configured to output commands to change the attitudes of the seat back 1b in the directions B by being operated in directions along shorter sides so that the seatback 1b is reclined in the forward direction and rearward direction.

A sensor portion (non-contact sensor) 5 is provided in the vicinity of the operational switch 4. An electrostatic capacitance sensor is applied as the sensor portion (non-contact sensor) 5 according to the embodiment. The sensor portion 5 includes a sensor electrode 5a and a detection circuit 5b. The operational switch 4 and the sensor portion 5 are mounted to a common switch assembly 3. The sensor portion 5 is arranged, as shown in FIG. 2, to have a range positioned above the operational switch 4 as a sensing range (detection range) S. The sensor portion 5 is configured to detect that an occupant that is seated on the seat 1 reaches for his/her hand to the operational switch 4 and that his/her hand is positioned close to the operational switch 4 in order to change the positions or attitudes of the seat 1.

Figure 3:
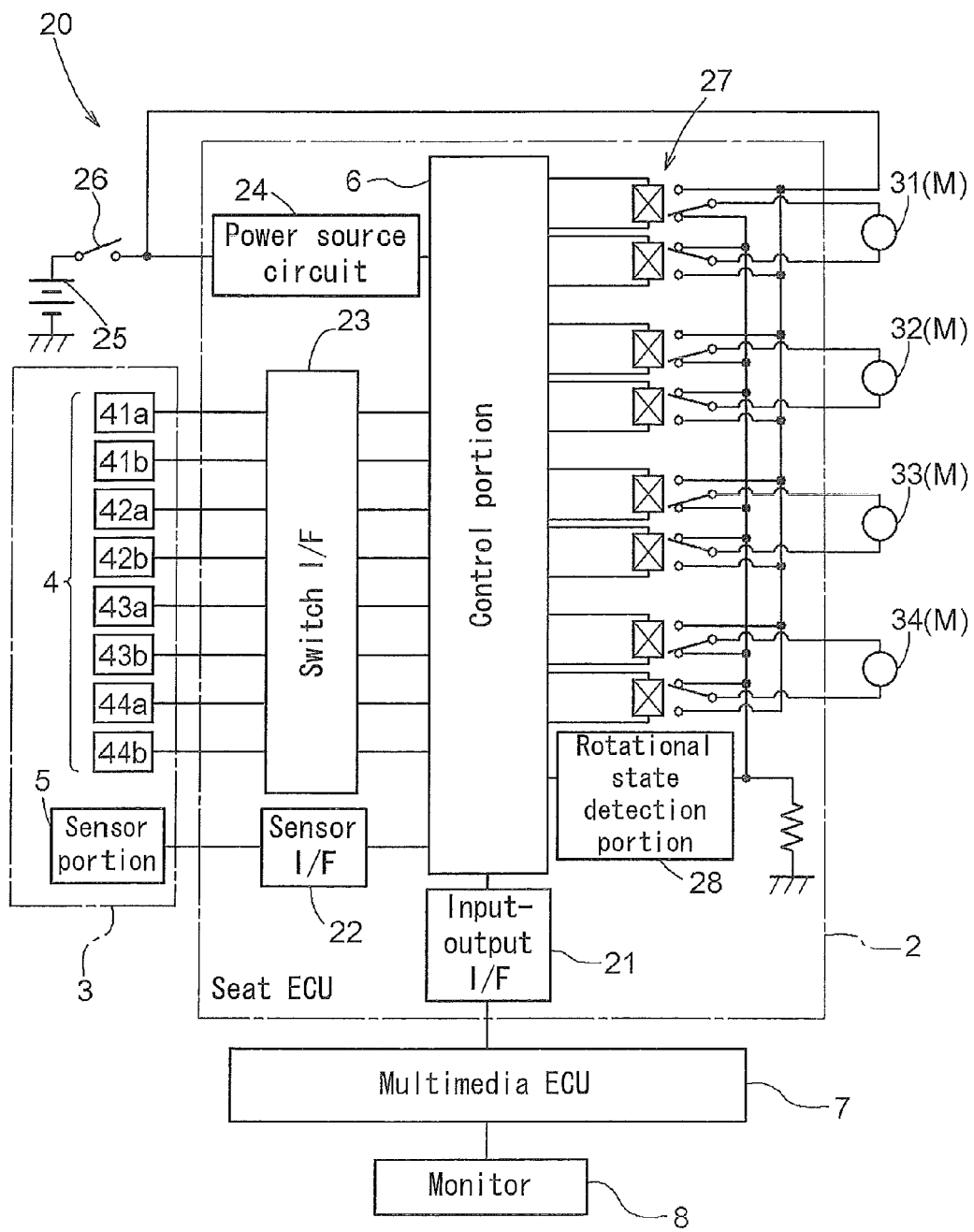
FIG. 3 is a schematic view of an entire construction of a power seat system for a vehicle.

As shown in FIG. 3, the power seat system 20 for the vehicle includes a seat ECU (electronic control unit) 2. A control portion 6 of the seat ECU 2 is connected to a battery 25 via a power source circuit 24 provided in the seat ECU 2. When an ignition switch 26 is ON, a constant electric voltage (e.g., 5V) which is stabilized by the power source circuit 24 is supplied to each portion of the seat ECU 2.

The operational switch 4 for adjusting the positions and attitudes of each portion of the seat 1 is connected to a switch interface (switch I/F) 23. As explained above, the switches 4A, 4B of the operational switch 4 is a compound switch which detects operations in plural directions. Accordingly, the operational switch 4 includes slide switches 41a, 41b, reclining switches 42a, 42b, lifter switches 43a, 43b, and front vertical switches 44a, 44b.

The slide switches 41a, 41b are configured to slide the seat 1 (i.e., the entire seat 1) in the front-rear directions, that is, in the directions A along the rail provided on the vehicle. The reclining switches 42a, 42b are configured to recline the seat back 1b in the forward direction and the backward direction, that is, to change the attitudes of the seatback 1b in the directions B. The lifter switches 43a, 43b are configured to move the seat 1 (i.e., the entire seat 1) in the upward and downward directions, that is, in the directions C, by moving the rear portion of the seat cushion 1a in the upward direction and the downward direction. The front vertical switches 44a, 44b are configured to move the front portion of the seat cushion 1a in vertical directions (i.e., up and down), that is, to change attitudes of the front portion of the seat cushion 1a in the directions D.

The control portion 6 is connected to motors (actuators) 31, 32, 33, 34 via respective relays 27. Direct current motors are applied as the motors M. The relays 27 include, for example, four pairs of relays corresponding to the motors M. Each of the motors M is connected to the control portion 6 via one of the pairs of the relays 27. Each pair of the relays 27 includes a pair of coils and a pair of switching terminals. In a case where one of the operational switches 4 is operated, the control portion 6 controls the energization to a pair of the coils which correspond to the operated operational switch 4. In consequence, the switching terminals of a pair of the relays 27 corresponding to the aforementioned operated operational switch 4 are switched, and a motor M corresponding to the switched relays 27 is independently actuated in a normal direction or in a reverse direction. The control portion 6 actuates the motor M at predetermined speeds by performing a PWM (pulse-width modulation) control to the actuated motor M.

The seat ECU 2 includes a rotational state detection portion 28 which detects the rotational state of each of the motors M. A detector which detects a rotational state based on an output from a rotation sensor provided in the vicinity of each of the motors M or a detector which detects a rotational state based on a ripple component in electric currents of the motor M may be applied as the rotational state detection portion 28. A detector with other constructions may also be applicable as the rotational state detection portion 28. A sensor using, for example, a Hall IC is applied as the rotation sensor. In a case where a ripple component is used for the detection, a ripple component is transformed into a pulse to generate a ripple pulse which synchronizes with a rotation of the motor M, and the rotational state of the motor M is detected based on the ripple pulse. For the explanatory purpose in this case, a detector which uses the ripple component is illustrated as the rotational state detection portion 28 in FIG. 3.

The control portion 6 is connected to the sensor portion 5 via a sensor interface (sensor I/F) 22. The control portion 6 receives detected results of the sensor portion 5 via the sensor interface 22 and outputs a display request to a multimedia ECU 7 via an input-output interface (input-output I/F) to display the information on a monitor 8 serving as a display device. The multimedia ECU 7 is configured to control a multimedia system such as a navigation system and an audio system, or the like. According to the embodiment, a multimedia system in which an audio system is incorporated into a navigation system is applied for an explanatory purpose. The multimedia system may include a camera system and a vehicle operation assisting system which displays an image captured by a camera mounted to a vehicle and superimposes guide lines on the captured image for assisting a vehicle operation. A system, which includes a single function such as a navigation system or an audio system, that is, a system that does not include multiple functions, may also be applied as the multimedia system. According to the embodiment, because the multimedia ECU 7 is configured to control displays on the monitor 8, the control portion 6 outputs the display request to the multimedia ECU 7. However, the structure of the embodiment is not limited to the foregoing example, and the control portion 6 may output the display request to another control means for controlling displays on the monitor 8.

Figure 4:
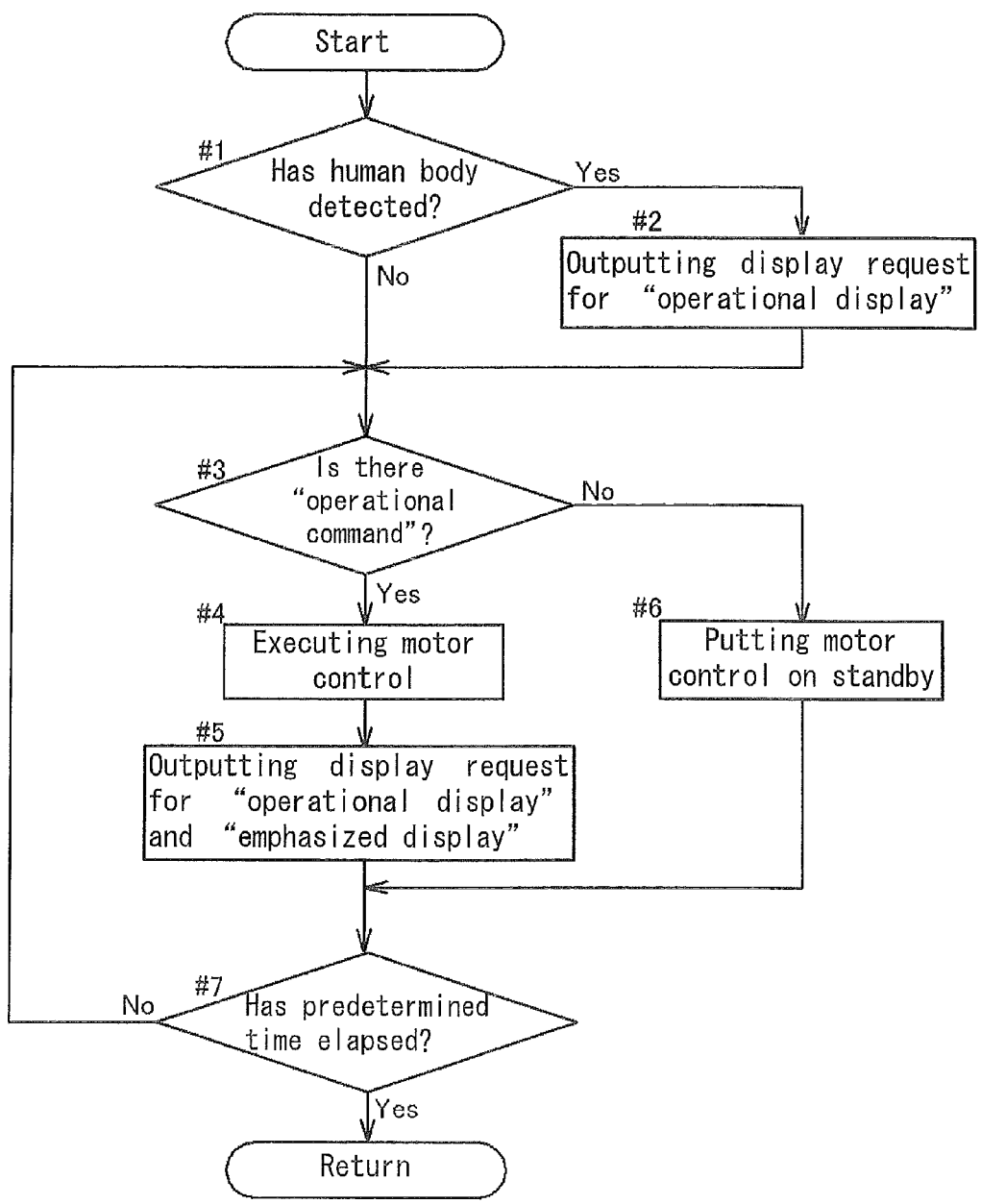
FIG. 4 is a flowchart schematically showing an example of a procedure of the power seat system for the vehicle according to the embodiment.

Referring to FIG. 4, a procedure of the power seat system for the vehicle will be explained hereinafter. In this case, a procedure of the control portion 6 when an occupant adjusts the positions or attitudes of the seat 1 will be explained.

When adjusting the positions or the attitudes of the seat 1, the occupant attempts to reach the operational switch 4 provided at a lower level relative to the seat surface by groping. As shown in FIG. 2, the sensor electrode 5a of the non-contact sensor 5 is arranged to sense in an obliquely upward direction. According to this construction, the hand of the occupant can be favorably detected before the occupant's hand which approaches to the operational switch 4 from upward to downward contacts the operational switch 4. The control portion 6 receives the detection results by the non-contact sensor 5 via the sensor interface 22 to determine whether or not a human body (e.g., the hand) exists (#1 in FIG. 4).

The control portion 6 outputs a display request of "operational display" to request to display "operational display" on the monitor 8 in a case where the human body (e.g., the hand) is detected (#2 in FIG. 4). The display request is transmitted to the multimedia ECU 7 via the input-output interface 21. The multimedia system primarily uses the monitor 8 provided in the vehicle, and the multimedia ECU 7 controls the monitor 8. The multimedia ECU 7 which receives the display request from the control portion 6 displays "operational display" by activating the display in a case where the monitor 8 does not show anything. On the other hand, in a case where another images are shown on the screen, the image is switched to show "operational display." According to the embodiment, once the multimedia ECU 7 receives the display request of the "operational display," the multimedia ECU 7 keeps showing the "operational display" for a predetermined time.

Figure 5:
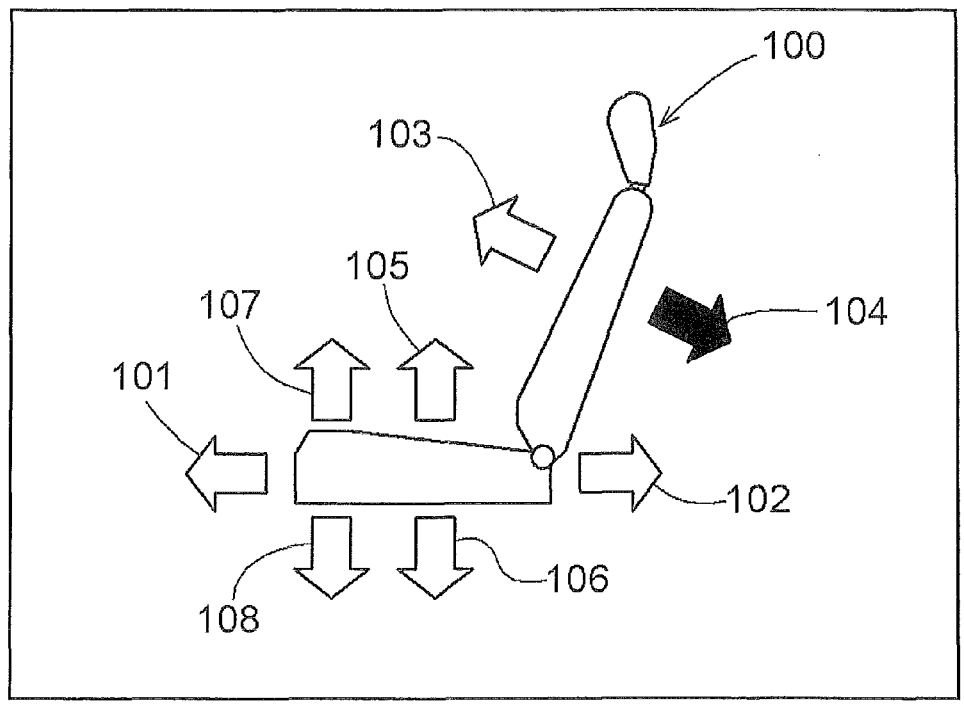
FIG. 5 is an explanatory view showing an example of a display on a screen.
Figure 6:
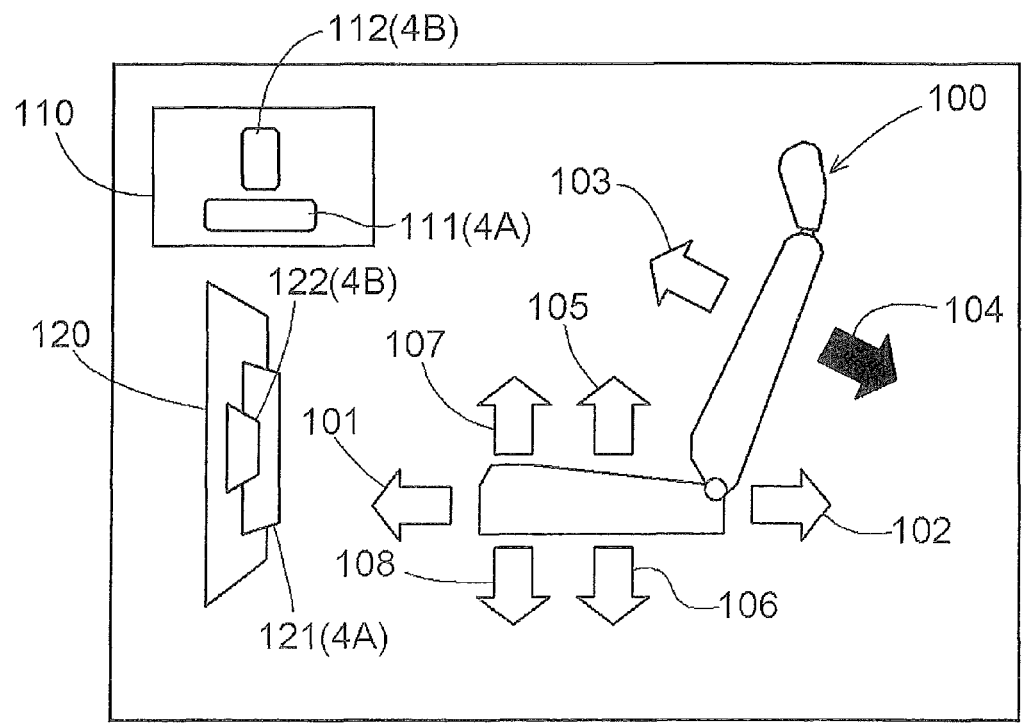
FIG. 6 is an explanatory view showing an example of a display on the screen.

In those circumstances, as shown in FIG. 5, the "operational display" is an indication which shows adjustable portions and directions of the seat 1 by the operational switch 4. As shown in FIG. 5, adjustable directions of the seat 1 (i.e., illustrated seat 100) are indicated with arrows 101-108. The occupant can visually confirm the adjustable directions of the seat 1 by the illustrated seat 100 and the arrows 101-108 to adjust the seat 1 as desired. Further, as shown in FIG. 6, an illustration of a front view of the operational switch 4 and an illustration of a perspective view of the operational switch 4 which corresponds to the view of the operational switch 4 seen from the occupant may also be shown on the monitor (display device) 8. The numeral 111 in FIG. 6 indicates the first switch 4A of the illustrated seat 110 of the front view and the numeral 112 indicates the second switch 4B. The numeral 121 in FIG. 6 indicates the front switch 4A of the illustrated seat 120 of the perspective view and the numeral 122 indicates the second switch 4B.

According to the embodiment, the monitor 8 includes a touch screen which allows the occupant a tangible operation on the screen, in other words, the monitor 8 includes a touch screen which enables the user to interact with what is displayed directly on the screen). By pressing the arrows 101-108 shown in FIGS. 5 and 6 with fingers, or the like, the occupant can adjust the seat 1 to a desired direction. In other words, the arrows 101-108 serve as touch screen buttons. Even if the "operational display" is shown on monitor 8, the seat 1 is adjustable by operating the operational switch 4. Accordingly, the occupant can adjust the seat 1 by operating the operational switch 4 or the touch screen buttons 101-108 (i.e., by sending the operational command by means of operating the operation switch 4 or the touch screen buttons 101-108).

The operational command provided to the operational switch 4 by the user is transmitted to the control portion 6 via the switch interface (switch I/F) 23, and the operational command provided to the touch screen button 101-108 by the user is transmitted to the control portion 6 via the multimedia ECU 7 and the input-output interface (input-output I/F) 21. The control portion 6 determines whether or not there is an "operational command" (#3 in FIG. 4) and executes a motor control in accordance with the operational command (#4 in FIG. 4).

In a case where the occupant provides the operational command and the corresponding motor M is actuated, the adjusting portion or direction of the seat 1 which is in adjustment is emphasized compared to other indications of the adjustable portions and directions of the "operational display." Namely, the control portion 6 outputs the display request of "operational display" and the "emphasized display" on the monitor 8 via the multimedia ECU 7. For example, in a case where the occupant provides an operational command to recline the seatback 1b in the backward direction, as shown in FIGS. 5 and 6, the arrow 104 is emphasized so as to be distinguished from other arrows. Accordingly, even if the operational switch 4 is operated by groping, the adjusting portion and adjusting direction is clearly shown to the occupant. The emphasized display of the touch screen button corresponding to the adjusting direction or the adjusting portion (i.e., the direction or the portion in adjustment) is shown during the operational command is inputted. In those circumstances, even if a predetermined time for displaying the "operational display" is elapsed, the "operational display" is continuously exhibited. According to the embodiment, the request for the "emphasized display" is outputted during the operational command is inputted. In those circumstances, the control portion 6 may also be configured to output the request for "operational display" simultaneously during the operational command is inputted.

In a case where the operational command is not inputted, the control portion 6 puts the motor control on standby (#6 in FIG. 4), and determines whether there is the "operational command" or not until the predetermined time elapses (#7, #3 in FIG. 4). In a case where the predetermined time elapses, a series of procedures are ended (#7 in FIG. 4).

According to the embodiment, the "operational display" which indicates the portions and directions of the seat 1 adjustable by the operational switch 4 is displayed on the monitor 8 (display device) in the vehicle. Thus, according to the construction of the embodiment, the occupant appropriately operates the operational switch 4 while visually confirming the operational display shown on the monitor 8. Further, by additionally providing the functions of the "emphasized display," the occupant himself/herself can visually confirm the adjusting portion or the adjusting direction which is actually adjusted by the occupant. In addition to that, by providing the touch screen panel for the monitor 8, the occupant can change the positions and the attitudes of the seat 1 by operating the buttons on the touch screen panel which can be readily seen by the occupant instead of the operational switch 4 which needs to be operated by groping.

Further, according to the construction of the embodiment, the "operational display (touch screen buttons)" appear(s) on the monitor 8 only by sensing that the occupant's hand is approaching the operational switch 4. In other words, the "operational display (touch screen buttons)" is (are) shown on the touch screen panel without particular operation, for example, selecting the necessary command buttons for displaying particular images by showing a menu on the monitor 8. Thus, the occupant can use the touch screen panel to adjust the positions or attitudes of the seat 1 as an extension of the operation for operating the operational switch 4. Because the operational display shown on the touch screen panel is readily seen by the occupant, the power seat system for the vehicle which excels in the visibility and the operability is provided.

The motor M controlled by the control portion 6 in order to adjust the position and attitude of each portion of the seat 1 is likely to be actuated at a constant speed in a normal state which excludes the start and the end of the motor actuation. The rotation speed of the motor M in the normal state is generally at a low speed to avoid the unnecessary excessive operation for adjustment by the excessive operational command by the occupant, that is, to avoid that the position and the attitude of the adjusted portions of the seat 1 are deviated from the desired position or attitude. In a case where the occupant wants to make slight (fine) adjustments of the positions or the attitudes of the seat 1, the seat adjustment is completed in relatively short time even if the motor M is actuated at low speed because the moving distance of the seat 1 is shorter. However, in a case where the seatback 1b is returned from a substantially flat state to a seating state, or in a case where the seat cushion 1a is returned from the rearmost position for taking a rest to a forward position corresponding to a position when driving the vehicle, the moving distance of the seat 1 is increased. If the motor M actuates at the low speed in those circumstances, the time required for completing the adjustment of the seat 1 is relatively long, and the convenience of the power seat for the occupant is degraded.

In light of the foregoing, the power seat system 20 for the vehicle according to the embodiment is configured so that the actuation speed (rotation speed) of the motor M actuated for adjusting the position and the attitude of the seat 1 is changeable. For example, in response to the time for operating the operational switch 4, the control portion 6 is configured to increase the actuation speed (rotation speed) of the motor M up to a predetermined upper limit either continuously or in a stepwise manner. The control portion 6 is also configured to increase the actuation speed (rotation speed) of the motor M up to a predetermined upper limit either continuously or in a stepwise manner when an operational command is provided to the operational display (touch screen button) on the touch screen panel.

Figure 7:
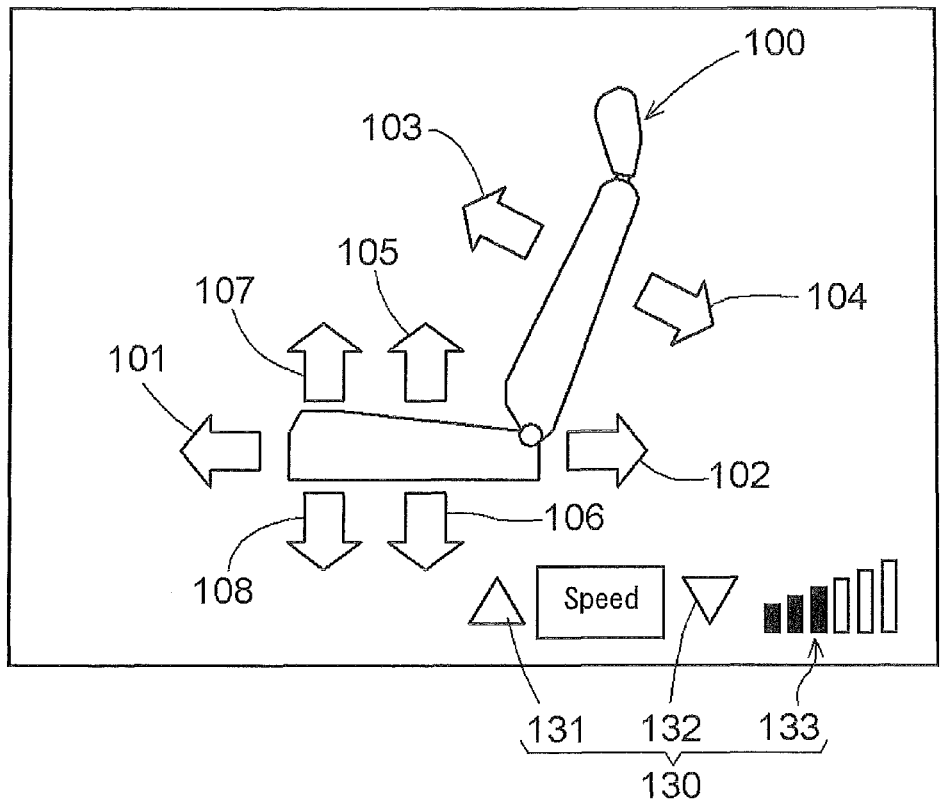
FIG. 7 is an explanatory view showing an example of a display on the screen.

Further, as shown in FIG. 7, an operational display (touch screen button; speed change commanding portion) 130 for changing the operation speed (rotation speed) of the motor M may be provided on the touch screen panel. For example, as shown in FIG. 7, the touch screen button 130 includes a first touch screen button 131 for increasing the rotation speed of the motor M, a second touch screen button 132 for decreasing the rotation speed of the motor M, and an indicator 133 showing the actuation speed (rotation speed) of the motor M. According to the foregoing construction, because the occupant is allowed to directly change the actuation speed (rotation speed) of the motor M by means of the touch screen buttons, the convenience of the power seat system for the occupant is enhanced. The structure of the operational display (touch screen button) for changing the operation speed (rotation speed) of the motor M is not limited to the example shown in FIG. 7, and may be varied. For example, simple switching buttons for high speed and low speed may be applied.

As an instance where the power seat system 20 for the vehicle actuates the motor M at a relatively high speed, an emergency case is included. The emergency case is, for example, that the control portion 6 adjusts the position and/or the attitude of the seat 1 compulsorily and suddenly to the position and/or the attitude with which a seatbelt and an airbag, or the like function most effectively when a vehicle collision, or the like, occurs irrespective of the command by the occupant. The control portion 6 actuates the motor M at a high speed based on detected results of a collision detection sensor, or the like. In a case where the motor M is actuated at least two speeds, for example, the high speed and the low speed, including the foregoing emergency case, the direct current motor M is actuated at the low speed in a normal operation. In this case, when the speed mode is changed to the high speed by the occupant, the direct current motor M is actuated at high speed in a high speed operation mode.

The control portion 6 needs to control the motor M at both of the high speed mode and the low speed mode of the motor M. As explained above, the control portion 6 receives the information of the rotational state of the direct current motor M from the rotational state detection portion 28 to actuate the motor M by the PWM (pulse-width modulation) control. Generally, the motor control for a direct current motor M involves modulations of a duty cycle (i.e., duty rate) for the pulse-width modulation control at predetermined cycle T in response to the rotational state in order to smoothly rotate the motor M. In this case, at the same cycle T, the rotational state of the motor M is sampled.

In a case where the direct current motor M is actuated at the high rotation speed and the low rotation speed, it is necessary to set the cycle T which is adjusted to at least the high rotation speed of the direct current motor M in order to securely actuates the motor M at the high speed. However, in case of actuating the direct current motor M at the low speed, the rotating amount of the direct current motor M in the same cycle T is less than that of the high speed rotation mode of the motor M. Particularly, in a case where the rotating amount of the motor M is less than one cycle when the motor M is actuated at the low speed, the detection precision of the rotational state of the motor M deteriorates. In order to ensure the rotating amount of the motor M, a cycle T' which is longer than the cycle T may be separately set for the low speed rotation of the motor M, however, the motor M rotates more smoothly when the modulation of the duty cycle (duty rate) for the pulse-width modulation control is performed at a shorter cycle likewise at the high speed rotation of the motor M.

In light of the foregoing, according to the construction of the embodiment, the rotational state of the motor M is sampled at every cycle T which is the same cycle with the sampling timing of the rotational state at the high speed rotation of the motor M, and a predetermined number of times of the sample results are temporarily memorized. The rotational state detection portion 28 detects the rotational state of the motor M on the basis of the latest sample result and the previous sample result which is predetermined times (cycles) before. According to this construction, by extending the hypothetical sampling cycles (times), the rotating amount of the motor M which is equal to or greater than a predetermined level can be ensured, and the detection precision of the rotational state is enhanced even at the low speed rotation of the motor M. Further, because the cycle T for the sampling of the low speed rotation of the motor M is set to be the same with the cycle T for the high speed rotation, the modulation of the duty cycle (duty rate) for the pulse-width modulation is performed at every cycle T. Thus, according to the construction of the embodiment, while enhancing the detection precision of the rotational state, a fine or subtle modulation for the duty cycle (duty rate) can be performed at the low speed rotation of the motor M. In case of the high speed rotation of the motor M, memorizing one sample result per cycle T is sufficient. The rotational state detection portion 28 detects the rotational state of the motor M based on the latest sample result and which is the last sample result among the previous sample result at the high speed rotation. As explained above, the rotational state of the motor M in accordance with the actuation speeds can be readily achieved by increasing temporary memory region and changing an objective data corresponding to the sample results for detecting the rotational state.

Figure 8:
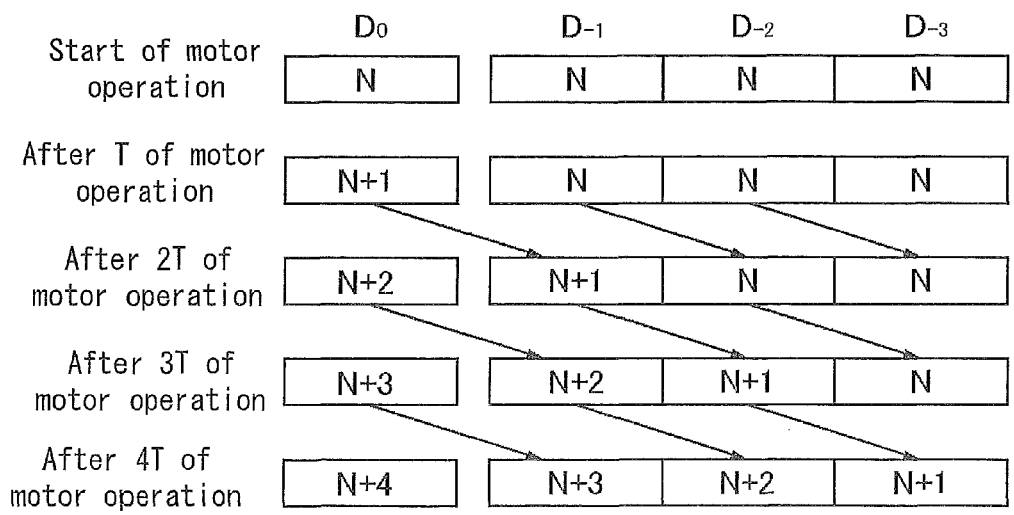
FIG. 8 is an explanatory view showing a sampling of a rotational state and a temporary memorizing method of sampling results.

Referring to FIG. 8, the sampling of the rotational state and a method for temporarily memorizing the sample results will be explained hereinafter. Reference "N" in FIG. 8 indicates a sampling number. For example, in this embodiment, the motor M starts the actuation when the sampling number "N" is provided. The sampling number "N+1" indicates the sampled rotational state at the timing that time (cycle) T elapsed after the motor M started the actuation. The sampling number "N+2" indicates the sampled rotational state at the timing that time (cycle) 2T elapsed after the motor M started the actuation. The same rule applies to subsequent sampling numbers. According to the embodiment, for example, a construction which includes a memory means (buffer or register) which can temporarily memorize sample results of the last three times is provided. The capacity of the memory means (buffer number, register number) is determined in accordance with the difference of the rotational speed of the motor M between when the motor M is actuated at the higher speed and when the motor M is actuated at the lower speed. In this embodiment, the rotational speed of the motor M at the higher speed is assumed to be approximately three times faster than the rotational speed of the motor M at the lower speed. Namely, in a case where the motor M is rotated at the higher speed, the buffer (register) which stores the latest sample result and the buffer (register) which stores the last sample result are necessary. However, in case where the motor M is rotated at the lower speed, the buffer (register) which stores the sample results of the last three times (three times before) is necessary in addition to the buffer (register) which stores the latest sample result. The memory means may be structured by a ring buffer, or a shift register, and the oldest data in the memory means is deleted when new data is obtained.

As shown in FIG. 8, for example, the memory means includes four buffers (registers) $D_0$, $D_{-1}$, $D_{-2}$, $D_{-3}$. $D_0$ corresponds to the buffer (register) in which the latest sample result is temporarily stored. $D_{-1}$, $D_{-2}$, and $D_{-3}$ correspond to the buffers (registers) in which the last sample result, the sample result of two times before, and the sample result of three times before are temporarily stored, respectively. At the start of the motor actuation, the latest sample result (N) is stored in all of the buffers (registers) $D_0$, $D_{-1}$, $D_{-2}$, $D_{-3}$ of the memory means as a default value. Thereafter, after an elapse of time T corresponding to the cycle T, the data in the buffer (register) $D_{-2}$ is moved to the buffer (register) $D_{-3}$, the data in the buffer (register) $D_{-1}$ is moved to the buffer (register) $D_{-2}$, the data in the buffer (register) $D_0$ is moved to the buffer (register) $D_{-1}$, and the latest sample result (N+1) is stored (memorized) in the buffer (register) $D_0$. Subsequently, in a case where the new sample result is obtained, the oldest entry of the data is to be deleted.

When the motor M is actuated at the higher speed, the rotational state of the motor M is detected every cycle T on the basis of the values of the buffers (registers) $D_0$ and $D_{-1}$. When the motor M is actuated at the lower speed, the rotational state of the motor M is detected every cycle T on the basis of the values of the buffers (registers) $D_0$ and $D_{-3}$. In other words, in a case where the motor M is rotated at the lower speed, the rotational state of the motor M is detected every cycle T while the sample result of every three cycles 3T is applied for detecting the rotational state of the motor M. When the motor M is actuated at the lower speed, in those circumstances, the rotational state is detected in accordance with the time elapsing from the start of the actuation. Because the rotational state of the motor is detected every 3T cycles when the motor M is actuated at the lower speed, the rotational state at the cycle 3T cannot be obtained at time T and time 2T after the start of the motor actuation, and the rotational state of the motor M corresponding to the cycle T and the cycles 2T after time T and time 2T, respectively, after the start of the actuation of the motor instead of the rotational state of the motor M before time 3T (before three cycles 3T). In those circumstances, because the first sample result (e.g., N) is stored in all of the buffers (registers), the buffers (registers) $D_0$, $D_{-3}$ are also referred at the time T and time 2T after the start of the motor actuation.

When the motor M is actuated at the higher speed, the modulation of the duty cycle (duty rate) of the pulse width modulation control is performed on the basis of the rotational state detected every cycle T. When the motor M is actuated at the lower speed, using the sample results of every three cycles 3T, the modulation of the duty cycle (duty rate) of the pulse width modulation control is performed on the basis of the rotational state detected by cycle T. Accordingly, smooth control for the motor M is achieved using a similar control method when the motor M is rotated at the higher speed and at the lower speed.

As explained above, the motor M is controlled by means of the pulse width modulation control (PWM control). The PWM control is executed using a carrier wave with a predetermined frequency. In those circumstances, the frequency of the carrier wave and/or a harmonic component of the carrier wave may serve as a noise element for other equipments of the vehicle. For example, when the frequency of the carrier wave and/or the harmonic component of the carrier wave become a noise element of a reception frequency of a radio which the occupant is listening, that noise element becomes an audible noise and thus the noise element becomes a noise in audio of radio. The same applies to other audio equipments such as televisions. According to the embodiment, the control portion 6 restrains the foregoing drawbacks by changing the frequency of the carrier wave of the PWM control by obtaining the information in a reception frequency band of the radio or the television, and a frequency band used for other audio systems which is in operation.

As explained above, according to the embodiment, the multimedia ECU 2 and the control portion 6 cooperate. In those circumstances, the control portion 6 receives the information regarding the reception frequency band of the radio and the television and the frequency band width of other audio systems (e.g., disc player, digital audio system, or the like) which are in operation. Then, the frequency of the carrier wave is changed so that the frequency of the carrier wave and/or its harmonic component does not affect the audio systems which are in operation.

For example, when the radio is not in use, the frequency of the carrier wave is set at A (e.g., 10 kHz) to perform the PWM control. Further, when the reception frequency of the radio is less than a predetermined frequency, the frequency of the carrier wave is set at A (e.g., 10 kHz) to perform the PWM control. On the other hand, when the reception frequency of the radio is equal to or greater than the predetermined frequency, the frequency of the carrier wave is set at B (e.g., 20 kHZ) to perform the PWM control.

The control portion 6 may change an actuation frequency of the sensor portion 5 which can detect a hand of the occupant which is approaching the operational switch 4 without contacting it based on the information obtained from the multimedia ECU 2. In a case where a capacitance sensor is applied as the sensor portion 5, the detection circuit 5b is likely to include a switched capacitor circuit. The switched capacitor circuit charges or discharges a capacitor at a predetermined frequency. Accordingly, the control frequency of the switched capacitor may become a source of the noise likewise the carrier wave of the PWM control. Thus, changing the control frequency of the switched capacitor on the basis of the information obtained by the multimedia ECU 2 enhances the performance of the system by avoiding the generation of the noise which affects the audio system in operation.

Further, an infrared non-contact sensor or a supersonic sensor, or the like, maybe applied as the sensor portion 5. Those sensors are actuated with predetermined actuation frequencies, respectively, when the infrared ray or the supersonic is emitted. Thus, the actuation frequency may become a source of the noise. Accordingly, changing the actuation frequency on the basis of the information obtained from the multimedia ECU 2 enhances the performance of the system by avoiding the generation of the noise which affects the audio system in operation.

Accordingly, a power seat system from a vehicle in which visibility and operability of the operational portion which is difficult to be seen is enhanced.

According to the disclosure of the embodiment, the operational display which indicates adjustable portions and directions of the seat 1 which are adjustable by means of the operational switch 4 is shown on a monitor 8 in the vehicle. Accordingly, the occupant can view the operational display very readily. Further, because the occupant does not contact the operational switch 4, there is no possibility that the occupant performs unnecessary seat adjustments by erroneously operating the operational switch 4. Further, the occupant can appropriately operate the operational switch 4 by visually confirming the operational display shown on the monitor 8 without depending on only groping. In consequence, according to the disclosure of the embodiment, the power seat system 20 for the vehicle which excels in the visibility and the operability is provided.

According to the embodiment of the power seat system 20 for the vehicle, the operational switch 4 is provided at a side of a seat cushion 1a of the vehicle seat 1.

Further, according to the embodiment of the power seat system 20 for the vehicle, the control portion 6 outputs a command to emphasize an indication of the portion and the direction of the vehicle seat 1 which is in the process of the adjustment among the operational display on the basis of the output from the operational switch 4. In other words, the control portion is configured to display an emphasized indication of the portion and the direction of the vehicle seat 1 which is in the process of the adjustment among the operational display on the basis of the output from the operational switch 4.

According to the disclosed construction, the adjusting portion which is actually adjusted by the command of the occupant can be visibly confirmed by the occupant. Thus the power seat system 20 for the vehicle which excels in the operability is provided.

According to the embodiment of the power seat system 20 for the vehicle, the monitor 8 includes a touch screen panel which receives an operation to a screen of the monitor 8, and the control portion 6 is configured to change the positions and attitudes of the vehicle seat 1 on the basis of an operational command to the touch screen panel which is received from the monitor 8.

According to the disclosed construction, the positions and the attitudes of the vehicle seat can be changed by operating the touch screen panel which the occupant can view when operating instead of the operational switch 4 which the occupant has difficulties to see and has to operate by groping. Further, when adjusting the seat 1 by means of the touch screen panel, approaching the hand to the operational switch 4 is sufficient to have the operational display on the touch screen panel appear without particular operation such as selecting the necessary options by showing the menu on the monitor 8. Accordingly, the occupant can adjust the seat 1 using the touch screen panel as an extension of the operation for operating the operational switch 4. Because the operational display shown on the touch screen panel is seen by the occupant, the power seat system 20 for the vehicle which excels in the visibility and the operability is provided.

According to the embodiment of the power seat system 20 for the vehicle, the touch screen panel includes the operational display (touch screen button) 130 which receives an operational command to change an operational speed for changing the positions and the attitudes of the vehicle seat 1, and the control portion 6 changes the operational speed on the basis of the operational command to the operational display (touch screen button) 130.

There are cases where it is favorable to slowly move the seat 1, for example, when the slight adjustment is made. And there are cases where the occupant would like to complete the changes of the positions or attitudes of the seat 1 fast, for example, when the seatback 1b is returned from the approximately flat attitude to the seating attitude, or vice versa. According to the construction of the disclosure, the operational command in order to change the operational speed of the seat 1 can be given to the control portion 6 via the touch screen panel. Accordingly, the power seat system 20 for the vehicle which excels in the operability can be provided.

According to the embodiment of the power seat system 20 for the vehicle, the monitor 8 is controlled by a multimedia system of the vehicle, and the control portion 6 displays the operational display on the monitor 8 via the multimedia system and receives the operational command to the touch screen panel via the multimedia system.

Navigation systems and audio visual equipments having an equalizer usually includes a display device having a touch screen panel. Further, in recent years, a system including functions, for example, a navigation system, a vehicle camera image display device, a radio receiver, a television receiver, an image reproduction system, and an audio player, or the like, which share one display device, are used. According to the disclosure of the embodiment, the operational display is shown on the monitor 8 which is controlled by the multimedia system which includes at least one of the aforementioned functions, and the operational command to the touch screen panel is inputted. The control portion 6 receives the operational command to the touch screen panel by showing the operational display on the monitor 8 by communicating with the multimedia system. According to this construction, the multimedia system and the power seat system for the vehicle can be readily and favorably connected only by constructing an interface (the input-output interface 21) for those systems even if the multimedia system and the power seat system for the vehicle are separately designed. Assuming that the occupant frequently uses the monitor 8 controlled by the multimedia system, the occupant is accustomed to the system and the favorable visibility and the operability are ensured. In consequence, the power seat system 20 for the vehicle which excels in the visibility and the operability is provided.

According to the embodiment of the power seat system 20 for the vehicle, the control portion 6 receives the information of a frequency applied to an audiovisual system from the multimedia system, and changes a frequency of a carrier wave of a pulse width modulation control for actuating the motor M to a frequency band width which does not interfere with the frequency applied to the audiovisual system.

Further, according to the embodiment of the power seat system 20 for the vehicle, the control portion 6 receives the information of a frequency applied to an audiovisual system, and changes a frequency of a carrier wave of a pulse width modulation control for actuating the motor M to a frequency band width which does not interfere with the frequency applied to the audiovisual system.

Multimedia systems may include audiovisual equipments such as a radio receiver and a television receiver, or the like. In a case where the frequency applied for the audio visual equipments (e.g., a broadcasting frequency of the radio or the television; a sampling frequency of a digital audio, or the like) interferes with the frequency of the carrier wave of the PWM control which is for actuating the motor M for moving the vehicle seat, the frequency of the carrier wave of the PWM may generate the noise in the audio sound and the images of the audio visual equipments. However, according to the construction of the embodiment, the control portion 6, which receives the information of the frequency applied to the audiovisual equipment from the multimedia system, changes the carrier wave frequency of the PWM control to the frequency bandwidth which does not interfere with the frequency applied to the audiovisual equipments. Accordingly, the possibility which generates the noise in the audio sound and the image of the audio visual equipments is restrained.

According to the embodiment of the power seat system 20 for the vehicle, the adjusting portions and directions include directions to slide the vehicle seat 1 in forward and backward directions, directions to recline the seatback 1b of the vehicle seat 1 in forward and backward directions relative to the seat cushion 1a of the vehicle seat 1, directions to move the vehicle seat 1 in upward and downward directions, and directions to move a front portion of the seat cushion 1a in vertically upward and downward directions.

According to the constructions of the disclosure, because the operational display appears on the monitor 8 only by approaching the occupant's hand for the operational switch 4, the power seat system 20 for the vehicle enables the occupant to visually confirm the operation in a large number of directions and positions, in other words, to visually confirm the operation of the large number of multiple operational switches 4 (41a, 41b, 42a, 42b, 43a, 43b, 44a, 44b) to change the positions and attitudes of the vehicle seat 1.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A power seat system for a vehicle, comprising:
an operational switch configured to be operated by an occupant for changing positions and attitudes of a vehicle seat whose positions and attitudes are electrically adjusted;
a sensor portion positioned in the vicinity of the operational switch and detecting a hand of the occupant approaching the operational switch without contacting the hand of the occupant; and
a control portion changing the positions and attitudes of the vehicle seat by actuating an actuator on the basis of an output from the operational switch, the control portion configured to display a visual operational display indicating adjusting portions and directions of the vehicle seat in response to an output from the sensor portion, at a display device provided in a vehicle.

2. The power seat system for the vehicle according to claim 1, wherein the operational switch is provided at a side of a seat cushion of the vehicle seat.

3. The power seat system for the vehicle according to claim 2, wherein the control portion is configured to display an emphasized indication of the portion and the direction of the vehicle seat which is in the process of the adjustment among the visual operational display on the basis of the output from the operational switch.

4. The power seat system for the vehicle, according to claim 2, wherein the display device includes a touch screen panel which receives an operation to a screen of the display device, and the control portion is configured to change the positions and attitudes of the vehicle seat on the basis of an operational command to the touch screen panel which is received from the display device.

5. The power seat system for the vehicle, according to claim 4, wherein the touch screen panel includes a speed change commanding portion which receives an operational command to change an operational speed for changing the positions and the attitudes of the vehicle seat, and the control portion changes the operational speed on the basis of the operational command to the speed change commanding portion.

6. The power seat system for the vehicle, according to claim 5, wherein the display device is controlled by a multimedia system of the vehicle, and the control portion displays the visual operational display on the display device via the multimedia system and receives the operational command to the touch screen panel via the multimedia system.

7. The power seat system for the vehicle, according to claim 4, wherein the display device is controlled by a multimedia system of the vehicle, and the control portion displays the operational display on the display device via the multimedia system and receives the operational command to the touch screen panel via the multimedia system.

8. The power seat system for the vehicle, according to claim 2, wherein the adjusting portions and directions include directions to slide the vehicle seat in forward and backward directions, directions to recline a seatback of the vehicle seat in forward and backward directions relative to a seat cushion of the vehicle seat, directions to move the vehicle seat in upward and downward directions, and directions to move a front portion of the seat cushion in vertically upward and downward directions.

9. The power seat system for the vehicle according to claim 1, wherein the control portion is configured to display an emphasized indication of the portion and the direction of the vehicle seat which is in the process of the adjustment among the visual operational display on the basis of the output from the operational switch.

10. The power seat system for the vehicle, according to claim 9, wherein the display device includes a touch screen panel which receives an operation to a screen of the display device, and the control portion is configured to change the positions and attitudes of the vehicle seat on the basis of an operational command to the touch screen panel which is received from the display device.

11. The power seat system for the vehicle, according to claim 10, wherein the touch screen panel includes a speed change commanding portion which receives an operational command to change an operational speed for changing the positions and the attitudes of the vehicle seat, and the control portion changes the operational speed on the basis of the operational command to the speed change commanding portion.

12. The power seat system for the vehicle, according to claim 11, wherein the display device is controlled by a multimedia system of the vehicle, and the control portion displays the visual operational display on the display device via the multimedia system and receives the operational command to the touch screen panel via the multimedia system.

13. The power seat system for the vehicle, according to claim 10, wherein the display device is controlled by a multimedia system of the vehicle, and the control portion displays the visual operational display on the display device via the multimedia system and receives the operational command to the touch screen panel via the multimedia system.

14. The power seat system for the vehicle, according to claim 1, wherein the display device includes a touch screen panel which receives an operation to a screen of the display device, and the control portion is configured to change the positions and attitudes of the vehicle seat on the basis of an operational command to the touch screen panel which is received from the display device.

15. The power seat system for the vehicle, according to claim 14, wherein the touch screen panel includes a speed change commanding portion which receives an operational command to change an operational speed for changing the positions and the attitudes of the vehicle seat, and the control portion changes the operational speed on the basis of the operational command to the speed change commanding portion.

16. The power seat system for the vehicle, according to claim 15, wherein the display device is controlled by a multimedia system of the vehicle, and the control portion displays the visual operational display on the display device via the multimedia system and receives the operational command to the touch screen panel via the multimedia system.

17. The power seat system for the vehicle, according to claim 14, wherein the display device is controlled by a multimedia system of the vehicle, and the control portion displays the visual operational display on the display device via the multimedia system and receives the operational command to the touch screen panel via the multimedia system.

18. The power seat system for the vehicle, according to claim 17, wherein the control portion receives the information of a frequency applied to an audiovisual system from the multimedia system, and changes a frequency of a carrier wave of a pulse width modulation control for actuating the actuator to a frequency band width which does not interfere with the frequency applied to the audiovisual system.

19. The power seat system for the vehicle, according to claim 1, wherein the control portion receives the information of a frequency applied to an audiovisual system, and changes a frequency of a carrier wave of a pulse width modulation control for actuating the actuator to a frequency band width which does not interfere with the frequency applied to the audiovisual system.

20. The power seat system for the vehicle, according to claim 1, wherein the adjusting portions and directions include directions to slide the vehicle seat in forward and backward directions, directions to recline a seatback of the vehicle seat in forward and backward directions relative to a seat cushion of the vehicle seat, directions to move the vehicle seat in upward and downward directions, and directions to move a front portion of the seat cushion in vertically upward and downward directions.

* * * * *